Patented Feb. 9, 1932

1,844,666

UNITED STATES PATENT OFFICE

ALBERT LEO, OF CHICAGO, ILLINOIS

SOLUBLE PECTIN PREPARATION

No Drawing.   Application filed September 9, 1927.   Serial No. 218,589.

This invention relates to a soluble pectin preparation for use in the making of jams and jellies.

Although dry pectin has heretofore been used in the making of jelly, it has always been found necessary to put the dry pectin into solution before adding the sugar. The reason for this is that dry pectin, difficultly soluble by itself, is even more so in the presence of large quantities of sugar, and will not form a clear solution but will remain indefinitely as a cloudy flock.

While it is nevertheless true that limited quantities of sugar will act as a dispersion agent for the pectin and aid in its dissolution, it has never, however, to the best of my knowledge, been deemed possible to prepare a dry mixture of pectin with all or substantially all of the sugar necessary to form a jelly so that the mixture may be used without the addition of further quantities of sugar in the jelly making process.

In my co-pending application entitled "Soluble gum preparation", Serial Number 44,360, filed July 17, 1925, I have described a soluble preparation comprising dry powdered pectin, an alkaline gas forming salt such as sodium bicarbonate, and an edible acid such as citric or tartaric. While this preparation in the proportions specified in that application dissolves readily in water, it must, nevertheless, in jelly making be dissolved before the addition of substantial quantities of sugar, or else a cloudy jelly results.

I have now found, however, by varying the proportions of the alkaline gas forming salt and acid to the pectin used, that when the mixture is added to water and heated to 218° F., it will produce a very satisfactory jelly.

It is therefore an object of this invention to provide a soluble pectin preparation that contains all of the essential ingredients necessary for the making of jelly in such proportion that without the addition of further ingredients, the preparation will form a jelly upon the addition of water and heating to 218° F.

Other and further important objects of this invention will be apparent from the disclosures in the specification and the appended claims.

My invention comprises mixing about 10 parts of pure powdered pectin (standardized so that one part of pectin will jelly 160 parts of sugar), 5 to 10 parts of an alkaline gas forming salt such as sodium bicarbonate, 12 to 17 parts of a powdered acid such as citric or tartaric and 1000 to 1600 parts of sugar. The pectin is preferably finely ground to pass a 200 mesh screen.

In the preparation of jelly using the above mixture, one heaping cup of my soluble pectin preparation is added for each cup of water used. The mass is then heated to 218° F., at which temperature the liquid will form a film and give the usual jelly tests. Heating is at once discontinued and the liquid mass poured out to cool. A clear firm jelly will invariably result from following this procedure. If fruit juices are used, a level cup of the pectin preparation should be used instead of a heaping cup and the liquid mass heated to 218° F. as above.

I consider the mixture of sodium bicarbonate and acid to be the effective dispersing agent for the pectin, since acid alone will not cause the pectin to go readily into solution in the presence of such large quantities of sugar. The reaction between the acid and the bicarbonate results in the formation of carbon dioxide gas in solution, and it is largely to this formation of gas that the dispersive effect may be attributed.

For satisfactory dispersion of the pectin, the preferred amount of sodium bicarbonate and acid, for instance, tartaric, to be used with 10 parts of standardized powdered pectin is 5 parts of each. The acid is also preferably finely powdered, as this is found to be advantageous. An additional quantity of acid equivalent to 7 parts of tartaric acid is necessary with the quantity of pectin used to produce the jellying effect. This additional quantity of acid is preferably in granular or crystal form so that its solution is sufficiently retarded to give the pectin time to go into solution first. If the quantities of sodium bicarbonate and acid used as a dispersing agent are increased about 10 parts of each to 10 parts of pectin, I have found that the mixture would not work satisfactorily when mixed with the sugar. My preferred composition is therefore, 10 parts of pectin, 5 parts sodium bicarbonate, 12 parts of tartaric acid and 1250 parts of sugar it will be apparent that in addition to these ingredients, dried fruit flavors or essences may be added to my preparation for the making of flavored jellies without the use of natural fruit juices.

I am aware that numerous details of the process may be varied through a wide range without departing from the spirit of this invention, and I do not desire limiting the patent granted other than as necessitated by the prior art.

I claim as my invention:

1. A soluble pectin preparation consisting of 10 parts of finely ground standardized pectin, 5 to 10 parts of sodium bicarbonate, 12 to 17 parts of tartaric acid and 1000 to 1600 parts of sugar.

2. A soluble pectin preparation in dry form, consisting of 10 parts of finely ground standardized pectin, 5 parts of sodium bicarbonate, 12 parts of tartaric acid and 1250 parts of cane sugar.

In testimony whereof I have hereunto subscribed my name at Chicago, Cook County, Illinois.

ALBERT LEO.